United States Patent [19]
Saito

[11] Patent Number: 5,339,309
[45] Date of Patent: Aug. 16, 1994

[54] TRANSMITTER-RECEIVER

[75] Inventor: Shin Saito, Tokyo, Japan

[73] Assignee: Sony Corporation, Tokyo, Japan

[21] Appl. No.: 996,715

[22] Filed: Dec. 24, 1992

[30] Foreign Application Priority Data

Dec. 27, 1991 [JP] Japan ................... 3-346621

[51] Int. Cl.⁵ .................. H04B 1/40; H04L 5/14
[52] U.S. Cl. ........................ 370/29; 370/32; 375/8; 375/104
[58] Field of Search ............. 370/31, 29, 32, 30, 370/24; 375/7, 8, 104; 331/185, 186; 329/372; 332/185

[56] References Cited

U.S. PATENT DOCUMENTS

| | | | |
|---|---|---|---|
| 4,520,474 | 5/1985 | Vilmur | 370/32 |
| 4,694,466 | 9/1987 | Kadin | 370/29 |
| 4,903,257 | 2/1990 | Takeda et al. | 370/29 |
| 5,123,008 | 6/1992 | Beesley | 370/29 |

FOREIGN PATENT DOCUMENTS 0331434 9/1989 European Pat. Off. .

OTHER PUBLICATIONS

International Patent WO 92/20164 (Downey) Nov. 12, 1992.

Primary Examiner—Wellington Chin
Attorney, Agent, or Firm—Lewis H. Eslinger; Jay H. Maioli

[57] ABSTRACT

A transmitter-receiver is simple in arrangement and can prevent a receiving circuit side from being disturbed; in which one channel is divided to provide a transmission slot and a reception slot. Transmission and reception are effected in the transmission slot and reception slot of one channel in a time division manner and a channel selection frequency synthesizer is commonly used both in the transmitting circuit and the receiving circuit. This transmitter-receiver includes a modulator circuit (40) of the transmitting circuit which has an oscillator (41) for modulating a signal into a predetermined frequency and a multiplier circuit (44) for converting an output signal of the oscillator (41) into a desired intermediate frequency. During the period of the transmission slot, the supply of a voltage to the multiplier circuit 44 is stopped.

6 Claims, 3 Drawing Sheets

TRANSMITTER-RECEIVER

BACKGROUND OF THE INVENTION

1. Field of the Invention

The present invention generally relates to transmitter-receivers and, more particularly, to a transmitter-receiver of TDMA/TDD (time division multiple access/time division duplex) system in which transmission and reception are effected at different times or in a time-division manner.

2. Description of the Prior Art

In a TDMA/TDD system transmitter-receiver utilized in a telepoint system or the like, a transmission frequency and a reception frequency are the same. As shown in FIG. 1 of the accompanying drawings, transmission slots T1 to T4 and reception slots R1 to R4 constitute one frame and the slots T1, R1; T2, R2; T3, R3; and T4, R4 are utilized in pairs.

According to the above transmission and reception system, the transmission and reception are effected in the transmission slots and the reception slots in a time division fashion so that the transmission frequency and the reception frequency can be made the same. Therefore, each transmission channel can be utilized highly efficiently. When this transmission and reception system is applied to a cordless telephone apparatus, for example, plural sets of cordless telephone apparatus can utilize the same frequency and a telephone conversation can be made by many cordless telephone apparatus simultaneously.

A transmitting circuit and a receiving circuit in the above TDMA/TDD system transmitter-receiver that effects the above transmission and reception are arranged as shown in FIG. 2 of the accompanying drawings.

In FIG. 2, reference numeral 10 generally depicts a transmitting circuit and reference numeral 20 generally depicts a receiving circuit. As shown in FIG. 2, in the transmitting circuit 10, an audio signal is supplied from an input terminal 11 to a digital transmission processor circuit 12, in which the audio signal is processed in such a fashion as to effect the TDMA/TDD system transmission. The audio signal thus processed is delivered at every transmission slot T1, for example.

The base band transmission signal from the digital transmission processor circuit 12 is supplied to a modulator circuit 13, in which the signal is modulated to a predetermined intermediate frequency signal $f_1$. It is customary that the modulator circuit 13 employs a phase-locked loop (PLL) circuit in its modulation. Therefore, under the control of the PLL circuit, there is obtained a signal frequency-modulated by a carrier signal (intermediate frequency signal $f_1$). The intermediate frequency signal $f_1$ output from the modulator circuit 13 is supplied to a mixer 14.

A frequency signal $f_2$ (hereinafter this frequency signal $f_2$ will be referred to as a channel selecting signal) output from a PLL frequency synthesizer 31 formed of a PLL circuit is supplied to the mixer 14. Then, the mixer 14 mixes the channel selecting signal $f_2$ with the intermediate frequency signal $f_1$ to provide a signal $f_3$ having a transmission frequency. The transmission signal $f_3$ having the transmission frequency is supplied through an amplifier 15, a bandpass filter 16 and a high frequency switch circuit 32 to an antenna 33. Then, the transmission signal $f_3$ is transmitted from the antenna 33. The channel selecting signal is a signal whose frequency is changed in response to a frequency of a transmission-reception channel.

In the receiving circuit 20, a signal transmitted during the reception slot R1 is received at the antenna 33. A frequency of the received signal and a frequency of the transmitted signal transmitted from the transmitting circuit 10 are equal to each other.

The received signal $f_3$ is supplied through the high frequency switch circuit 32, a bandpass filter 21 and an amplifier 21 to a mixer 23. Then, the channel selecting signal $f_2$ from the PLL frequency synthesizer 31 is supplied to the mixer 23 and the channel selecting signal $f_2$ is mixed to the received signal by the mixer 23, thereby converted into the intermediate frequency signal $f_1$ (first intermediate frequency signal). The first intermediate frequency signal $f_1$ is supplied through a bandpass filter 24 to a mixer 25. An oscillation signal $f_4$ having a constant frequency output from a local oscillator 26 is supplied to the mixer 25, in which the signal $f_4$ is mixed with the signal $f_1$ to provide a second intermediate frequency signal $f_5$. This second intermediate frequency signal $f_5$ is supplied through a bandpass filter 27 to a demodulator circuit 28, in which the signal modulated transmission is demodulated. Then, the demodulated signal is supplied to a digital reception processor circuit 29, in which it is processed in such a fashion as to become able to be received by the TDMA/TDD system. The audio signal thus processed is delivered to an output terminal 30.

The TDMA/TDD system transmitter-receiver shown in FIG. 2 makes effective use of the fact that the transmission frequency and the reception frequency are equal to each other. Therefore, one frequency synthesizer 31 can serve as both the transmission channel selecting signal generator circuit in the transmitting circuit 10 and the reception channel selecting signal generator circuit in the receiving circuit 20.

When the transmission and reception channel selecting frequency synthesizer is shared by the transmitting circuit and the receiving circuit, however, the intermediate frequency signal output from the modulator circuit 13 of the transmitting circuit 10 and the intermediate frequency signal (first intermediate frequency signal) output from the mixer 23 of the receiving circuit 20 have the same frequency $f_1$. If the frequencies treated by both the circuits 10 and 20 are the same, there is then the disadvantage such that the receiving side 20 is disturbed by the intermediate frequency signal from the transmitting circuit 10.

To avoid the receiving circuit 20 from being disturbed, it is proposed that a transmission channel selecting frequency synthesizer and a reception channel selecting frequency synthesizer are separately provided to change frequencies of intermediate signals of the transmitting circuit 10 and the receiving circuit 20. Since, however, the PLL type frequency synthesizer is relatively complex in arrangement, it is not desirable that one transmitter-receiver includes two PLL type frequency synthesizers from a standpoint of a manufacturing cost, an installation space, a consumed amount of electric power or the like.

Also, it is proposed that an oscillation frequency of one frequency synthesizer is changed in the transmission slot and the reception slot so that the intermediate frequency in the transmitting circuit 10 and the intermediate frequency in the receiving circuit 20 are changed. However, a time (guard band) between the transmission slot and the reception slot is remarkably small (e.g., 50 μs). Therefore, if a frequency synthesizer is arranged so as to become able to change its oscillation frequency in such a short period of time, then the frequency synthesizer becomes complicated in arrangement.

To prevent a radio interference from taking place when the receiving circuit and the transmitting circuit has the same intermediate frequency, it is proposed that the modulator circuit in the transmitting side is disabled during a period of the reception slot R to thereby prevent the intermediate frequency signal from being formed in the transmitting circuit 10 side during the period of the reception slot R. The PLL circuit needs a lot of time to be stabilized since it has been actuated. Also, the period of the reception slot is as short as about 1 millisecond. Accordingly, if the PLL circuit constructing the modulator circuit 13 is disabled during the period of the reception slot R, then the PLL circuit will not be locked substantially until the period of the next transmission slot T.

In a communication system (e.g., cordless telephone system) to which the above-mentioned TDMA/TDD system will be applied in future, it is expected that a very high frequency (e.g., 1 GHz band) is utilized as a transmission frequency. Therefore, it is difficult to construct a modulator circuit having such a high frequency using an oscillating circuit other than the PLL circuit.

Accordingly, although the modulator circuit is constructed by the PLL circuit in the TDMA/TDD system, the operation of the PLL circuit cannot be substantially stopped during the period of the reception slot R as described above. Therefore, the transmitting circuit and the receiving circuit cannot be substantially protected from a radio interference by the control of the modulator circuit.

OBJECTS AND SUMMARY OF THE INVENTION

Therefore, it is an object of the present invention to provide an improved transmitter-receiver in which the aforesaid shortcomings and disadvantages encountered with the prior art can be substantially eliminated.

It is another object of the present invention to provide a transmitter-receiver capable of effecting a communication based on the TDMA/TDD system and in which a receiving circuit and a transmitting circuit can be prevented from being disturbed by a radio interference by controlling a modulator circuit on the receiving circuit side.

It is still another object of the present invention to provide a transmitter-receiver which can be simplified in arrangement.

According to an aspect of the present invention, there is provided a transmitter-receiver for effecting transmission and reception by way of transmission slots and reception slots set within one channel in a time division manner. This transmitter-receiver comprises a frequency synthesizer for selecting a channel, a transmitting circuit for forming a transmission signal having a predetermined frequency from input data in cooperation with the frequency synthesizer, and a receiving circuit for forming output data from a reception signal having the predetermined frequency in cooperation with the frequency synthesizer, wherein the transmitting circuit includes modulating means for modulating the input data into a predetermined frequency and a multiplier circuit for converting an output signal of the modulating means into a predetermined intermediate frequency, the supply of a voltage to the multiplier circuit being stopped during a period of the reception slots.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

Figure 1:
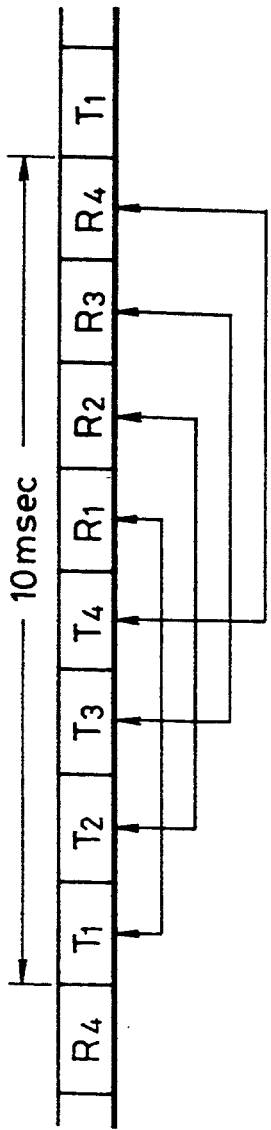
FIG. 1 is a diagram showing a frame structure to which references will be made in explaining a TDMA/TDD communication system.
Figure 2:
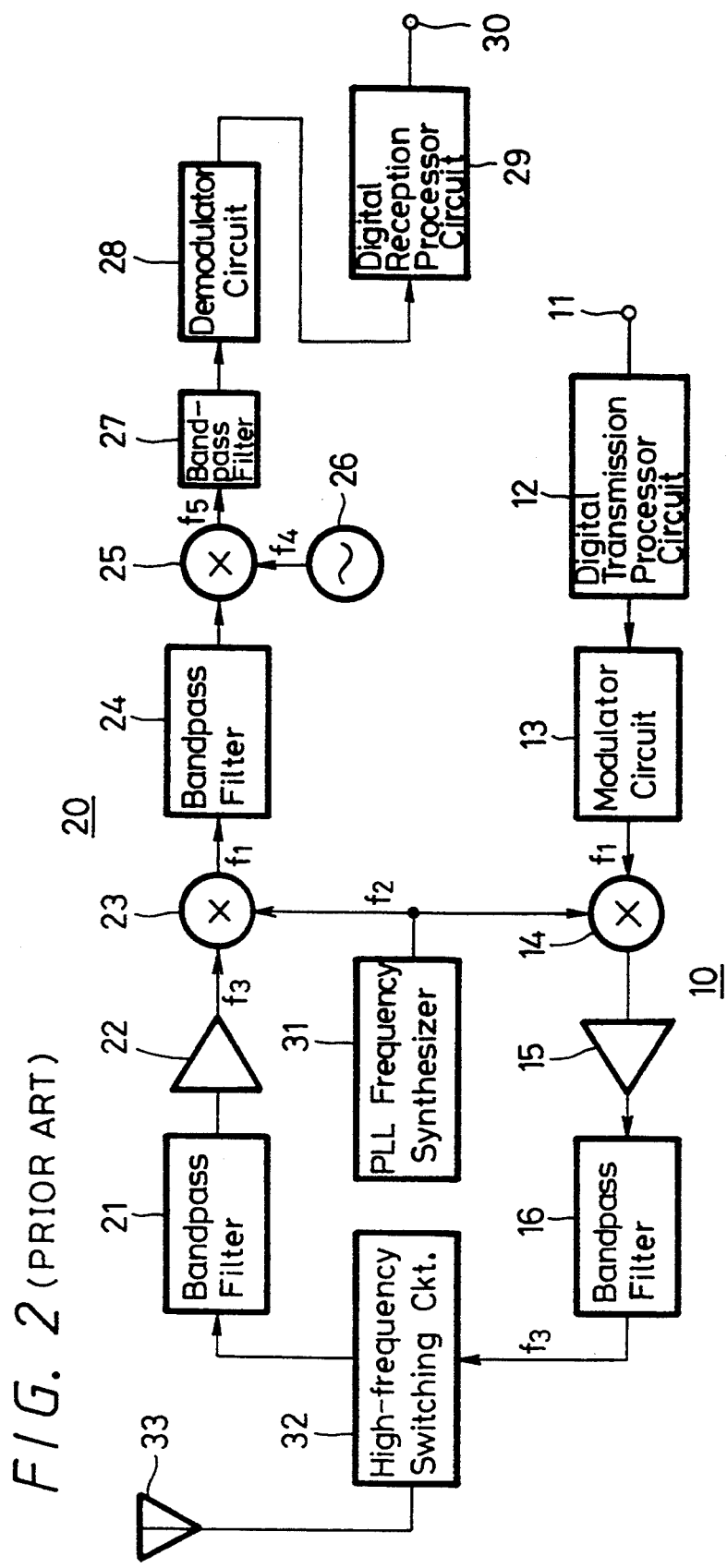
FIG. 2 is a block diagram showing an example of a transmitting circuit and a receiving circuit of a conventional TDMA/TDD system transmitter-receiver.
Figure 3:
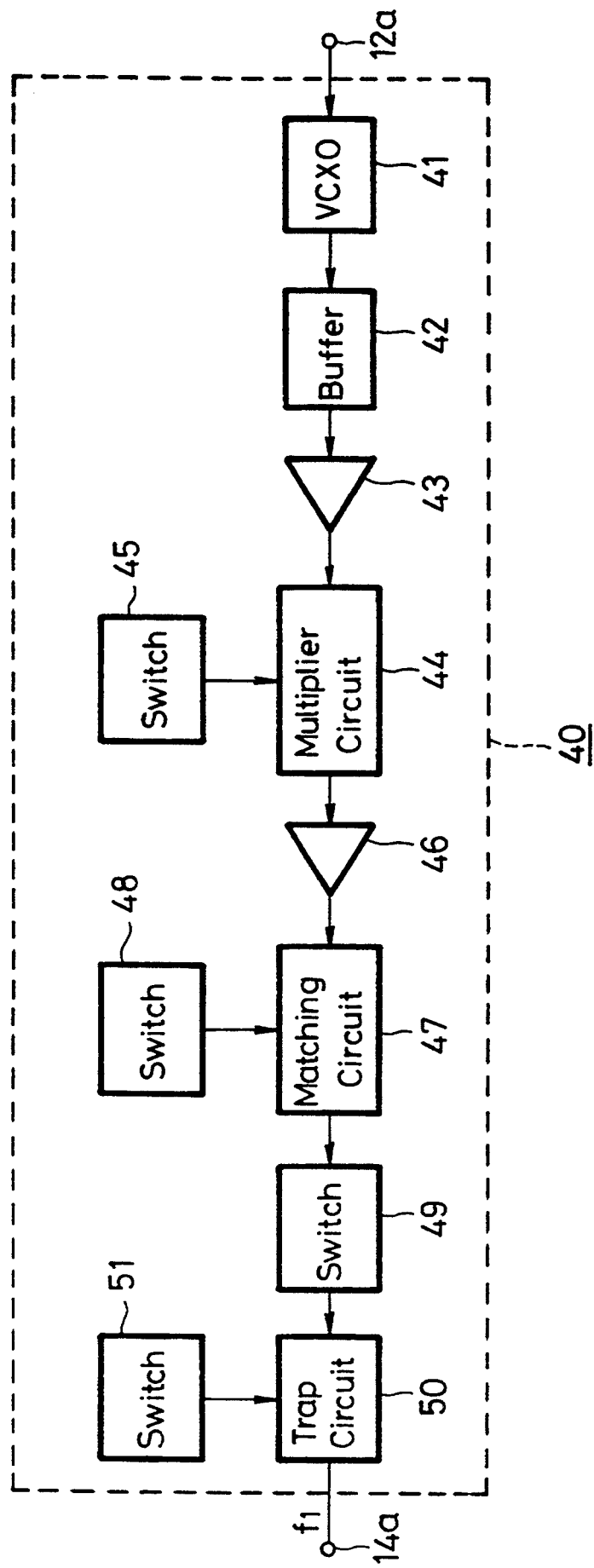
FIG. 3 is a block diagram showing a transmitter-receiver according to an embodiment of the present invention.
Figure 4:
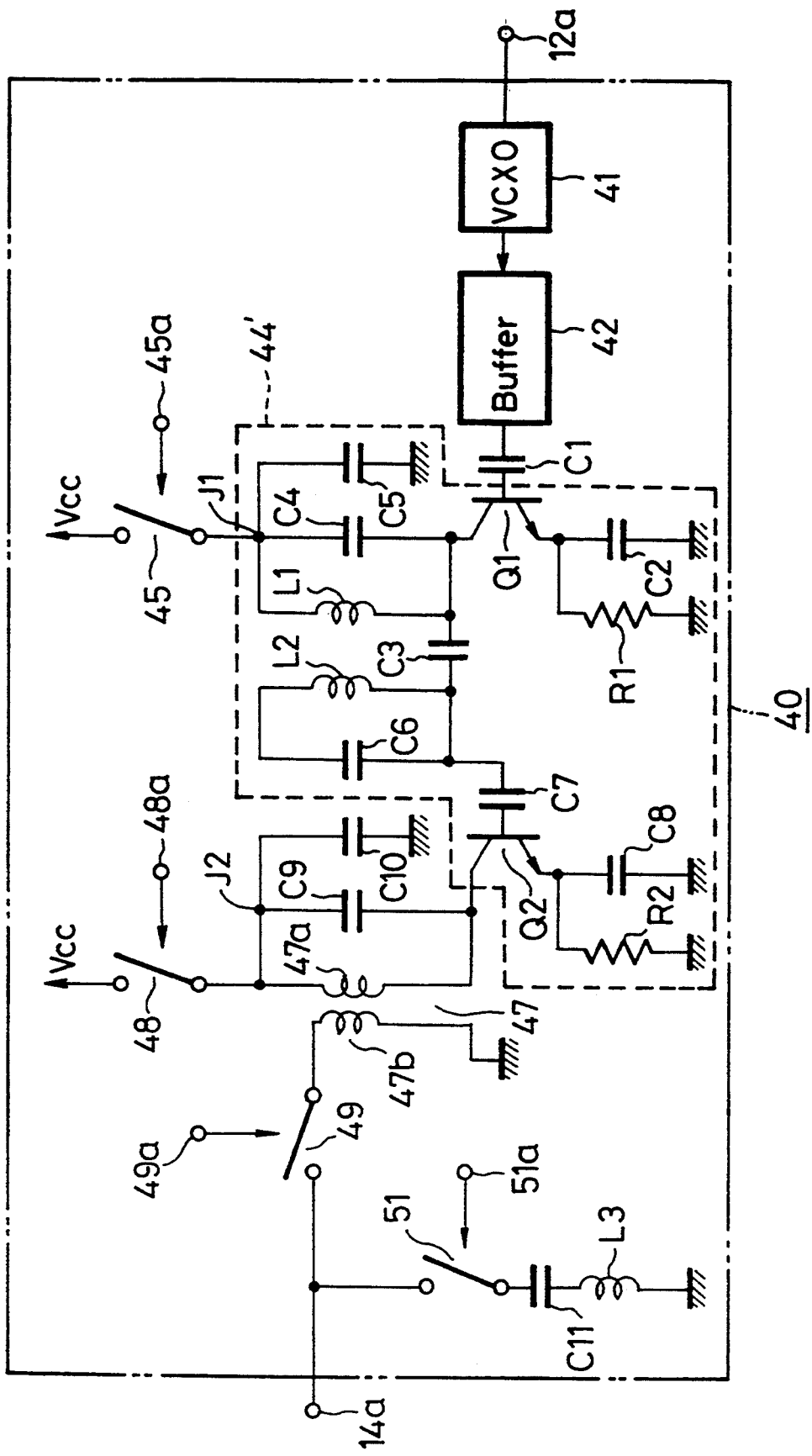
FIG. 4 is a diagram showing a concrete circuit arrangement of the transmitter-receiver according to the embodiment of the present invention.

A transmitter-receiver according to an embodiment of the present invention will hereinafter be described with reference to FIGS. 3 and 4 of the accompanying drawings. In FIGS. 3 and 4, like parts corresponding to those of FIGS. 1 and 2 are marked with the same references and therefore need not be described in detail.

According to this embodiment, the present invention is applied to the TDMA/TDD system transmitter-receiver in which the channel selecting frequency synthesizer is commonly served in the transmitting circuit and the receiving circuit. The modulator circuit 13 of the transmitter-receiver that is shown in FIG. 2 as an example of the prior art is replaced with a modulator circuit 40 shown in FIG. 3.

As shown in FIG. 3, the base band transmission data that was processed in TDMA/TDD system transmission from the digital transmission processor circuit 12 (see FIG. 2) is supplied through a terminal 12a to a voltage controlled crystal oscillator (VCXO) 41 in the modulator circuit 40. The voltage controlled crystal oscillator 41 is of the type such that its crystal is directly driven by a voltage signal supplied thereto. This oscillator 41 can derive an oscillation signal having a relatively low frequency up to 30 MHz.

The oscillation signal from the voltage controlled crystal oscillator 41 is supplied through a buffer 42 and an amplifier 43 to a multiplier circuit 44. The multiplier circuit 44 multiplies a signal supplied thereto n times (n is 1 or more). The supply of a drive voltage to the multiplier circuit 44 is controlled by a switch 45. The switch 45 is turned on and off together with other switches 48, 49 and 51, which will be described later on, by a control circuit (not shown) which controls transmission and reception timings of the transmitter-receiver of this invention. When the switch 45 is in its on state, a drive voltage is supplied to the multiplier circuit 44 which then converts the signal supplied thereto from the voltage controlled crystal oscillator 41 to a signal having a frequency n times as high as the original frequency.

An output of the multiplier circuit 44 is supplied through an amplifier 46 to a matching circuit 47. The matching circuit 47 effects the impedance matching and the supply of a drive voltage to the matching circuit 47 is controlled by the switch 48. The matching circuit 47 is supplied with the drive voltage through the switch 48, the signal supplied to the matching circuit 47 is processed in impedance matching and then the processed signal is supplied to the switch 49 side.

When the switch 49 is in its on state, the signal supplied from the matching circuit 47 side is supplied to a trap circuit 50. When the switch 51 connected to the trap circuit 50 is in its on state, the trap circuit 50 traps a signal supplied thereto to the ground side. When the switch 51 is in its off state, a signal (i.e., signal that is not trapped by the trap circuit 50) output from the trap circuit 50 is supplied through a terminal 14a to the mixer 14 (see FIG. 2) as the output $f_1$ of the modulator circuit 40. Then, the mixer 14 mixes the modulator output $f_1$ to the channel selecting signal $f_2$ from the PLL synthesizer 31 to provide the intermediate frequency signal $f_3$.

*The following table 1 shows the controlled state of the respective switches 45, 48, 49 and 51.

TABLE 1

|  | SWITCH 45 | SWITCH 48 | SWITCH 49 | SWITCH 51 |
|---|---|---|---|---|
| TRANSMISSION SLOT | ON | ON | ON | OFF |
| RECEPTION SLOT | OFF | OFF | OFF | ON |

As shown on the table 1, the switches 45, 48 and 49 are turned on during the period of the transmission slot T. Accordingly, during the period of the transmission slot T, a drive voltage is supplied to the multiplier circuit 44 and the matching circuit 47 and the output of the matching circuit 47 is supplied to the terminal 14a as the output of the modulator circuit 40. During the period of the reception slot R, only the switch 51 is turned on and the switches 45, 48 and 49 are in their off states so that the voltage is not supplied to the multiplier circuit 44 and the matching circuit 47, each of which is therefore not operated. Also, the trap circuit 50 traps the signal supplied thereto to the ground side and hence, no modulation signal is supplied to the terminal 14a at all.

FIG. 4 of the accompanying drawings shows an example of a concrete circuit arrangement of the modulator circuit 40 shown in FIG. 3.

As shown in FIG. 4, the oscillation signal supplied from the voltage controlled crystal oscillator (VCXO) 41 through the buffer 42 is supplied through a capacitor C1 to a multiplier circuit 44'. Since this multiplier circuit 44' is integrally formed with the amplifiers 43 and 46, an output of the capacitor C1 is supplied to the base of an NPN transistor Q1 which is operated as the amplifier 43. The emitter of the NPN transistor Q1 is grounded through a parallel circuit of a capacitor C2 and a resistor R1. Further, the collector of the NPN transistor Q1 is connected to one end of a capacitor C3.

The other end of the switch 45 on one end of which a source voltage Vcc is developed is connected through a capacitor C4 to one end of the capacitor C3 and a coil L1 is connected in parallel to the capacitor C4. A junction J1 between the switch 45 and the capacitor C4 is grounded through a capacitor C5. In this case, the switch 45 is turned on and off by a control signal which is developed at a control terminal 45a. The other end of the capacitor C3 is connected to one end of a coil L2 and one end of a capacitor C6. The other end of the coil L2 is connected to the other end of the capacitor C6. The multiplication number n of the multiplier circuit 44' is determined by constants of the coils L1, L2 and the capacitors C4, C6.

The other side (one end sides of the coil L2 and the capacitor C6) of the capacitor C3 is connected through a capacitor C7 to the base of an NPN transistor Q2. The NPN transistor Q2 is operated as the amplifier 46. The emitter of the transistor Q2 is grounded through a parallel circuit of a capacitor C8 and a resistor R2. The collector of the transistor Q2 is connected to one end of one coil circuit 47a of a transformer that constructs the matching circuit 47. The other end of the switch 48 at one end of which the source voltage Vcc is developed is connected to the other end of the coil circuit 47a, and a capacitor C9 is connected in parallel to the coil circuit 47a. A junction J2 between the coil circuit 47a and the switch 48 is grounded through a capacitor C10. In this case, the switch 48 is turned on and off by a control signal developed at a control terminal 48a.

One end of the other coil 47b of the transformer which constructs the matching circuit 47 is grounded and the other thereof is connected to one end of the switch 49. The switch 49 also is turned on and off by a control signal developed at a control terminal 49a. The other end of the switch 49 is connected to the terminal 14a side and connected through the switch 51 to a series circuit of a capacitor C11 and a coil L3 which constructs the trap circuit 50. The other end of the coil L3 is grounded. The switch 51 also is turned on and off by a control signal developed at a control terminal 51a.

The rest of the circuit shown in FIG. 4 is constructed similarly to the transmitter-receiver that is illustrated in FIG. 2 as an example of the prior art.

According to the transmitter-receiver including the modulator circuit 40 thus constructed, although the channel selection frequency synthesizer (synthesizer 31 in FIG. 2) serves as both the transmission channel selection synthesizer and the reception channel selection synthesizer and the frequencies of the intermediate frequency signals in the transmitting circuit and the receiving circuit are made the same, the signal of the transmitting circuit can be prevented from disturbing the receiving circuit side. More specifically, during the period of the reception slot R, only the switch 51 is turned on and other switches 45, 48 and 49 are all turned off, whereby the drive voltage is not supplied to the multiplier circuit 44 and the matching circuit 47. Therefore, the multiplier circuit 44 and the matching circuit 47 are not operated and the signal is trapped to the ground by the trap circuit 50 so that the processing, in which the oscillation signal output from the voltage controlled crystal oscillator 41 is delivered, is not effected at all. Thus, when the frequency synthesizer is commonly used both in the transmitting circuit and the receiving circuit, the frequencies of the intermediate frequency signals used in both the transmitting circuit and the receiving circuit are exactly the same. However, during the period of the reception slot R, the processing of the intermediate frequency signal is not effected in the transmitting circuit at all. Hence, the receiving circuit can be prevented from being disturbed by a radio interference of the intermediate frequency signal from the transmitting circuit. Further, the even when there is another transmitter-receiver which is operated around the above transmitter-receiver, other transmitter-receiver also can be prevented from being disturbed.

According to the circuit arrangement of this embodiment, since the oscillation output of the voltage controlled crystal oscillator 41 is multiplied by the multiplier circuit 44 to obtain the intermediate frequency signal, the voltage controlled crystal oscillator 41 having a relatively low oscillation frequency can be utilized as a modulating means within the modulator circuit 40. This voltage controlled crystal oscillator 41 is simple in arrangement and inexpensive. Therefore, since the circuit that is complicated in circuit arrangement like the PLL circuit need not be utilized as the modulating means, the modulator circuit becomes simple in arrangement.

While the operation within the modulator circuit 40 is perfectly controlled by a plurality of switches 45, 48, 49 and 51, the present invention is not limited thereto. In this case, if there is provided at least the switch 45 which controls the multiplier circuit 44, then the radio interference can be prevented at the lowest. Accordingly, the switches 48, 49 and 51 may be omitted based on the situation such that a disturbing wave occurs in actual practice, if necessary. Further, it is possible to omit the amplifier 46 which amplifies the output of the multiplier circuit 44. However, if this amplifier 46 is omitted, then the level of the intermediate frequency signal output from the modulator circuit 40 is lowered.

According to the present invention, since the output of the modulating means is multiplied by the multiplier circuit to provide the intermediate frequency signal, the modulation frequency in the modulating means can be lowered so that the modulating means can be simplified in which no PLL circuit is utilized. Also, during the period of the transmission slot, the multiplier circuit is disabled and the multiplier circuit outputs no modulation signal so that the signal within the transmitting circuit can be prevented from exerting a bad influence on the receiving circuit side.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A transmitter-receiver for effecting transmission and reception by way of transmission slots and reception slots set within one channel in a time division manner, comprising:
   (a) a frequency synthesizer for producing a signal having a first predetermined frequency corresponding to said one channel;
   (b) a transmitting circuit receiving input data for forming a transmission signal having said first predetermined frequency from said input data and said signal from said frequency synthesizer; and
   (c) a receiving circuit for forming output data from a reception signal having said first predetermined frequency by mixing said reception signal with said signal having said first predetermined frequency from said frequency synthesizer, wherein said transmitting circuit includes modulating means for modulating said input data into a second predetermined frequency and a multiplier circuit for converting an output signal of said modulating means into a predetermined intermediate frequency, the supply of a voltage to said multiplier circuit being stopped during a period of said reception slots.

2. The transmitter-receiver according to claim 1, wherein said modulating means includes a voltage controlled crystal oscillator which generates an oscillation signal having said second predetermined frequency on the basis of said input data.

3. The transmitter-receiver according to claim 1, wherein said transmitting circuit further includes an amplifier which amplifies an output of said multiplier circuit.

4. The transmitter-receiver according to claim 1, wherein said transmitting circuit further includes a matching circuit for performing transmission medium impedance matching of an output of said multiplier circuit, a supply of a voltage to said matching circuit being stopped during a period of said reception slots.

5. The transmitter-receiver according to claim 1, wherein said transmitting circuit further includes a switch which disconnects the connection between said multiplier circuit and a mixer which mixes an output of said multiplier circuit and an output of said frequency synthesizer during the period of said reception slots.

6. The transmitter-receiver according to claim 1, wherein said transmitting circuit further includes a trap circuit connected to an output of said multiplier circuit, and a mixer having a first input connected to said signal from said frequency synthesizer and a second input connected to said trap circuit and to said output from said multiplier circuit, whereby said trap circuit traps the second input of said mixer to ground potential during the period of said reception slots.

* * * * *